April 5, 1932.      J. B. HANSELL      1,852,651
ELECTRICAL TRANSFORMER
Filed Aug. 19, 1930
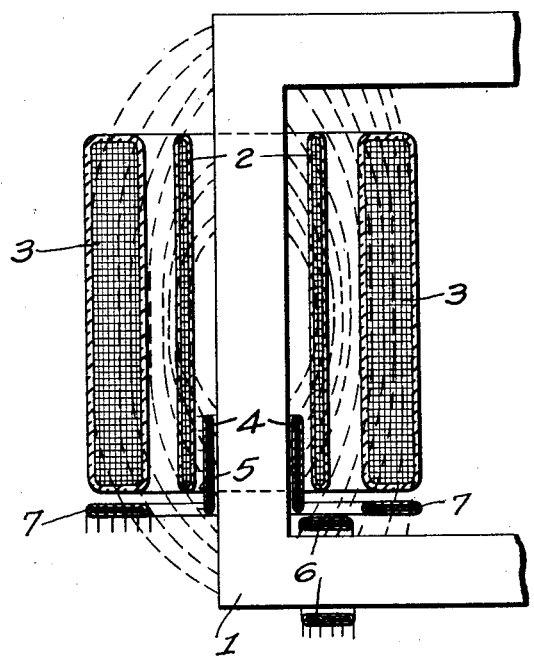
INVENTOR
John B. Hansell.
BY
ATTORNEY Patented Apr. 5, 1932

1,852,651

UNITED STATES PATENT OFFICE

JOHN BENTLEY HANSELL, OF PENDLETON, ENGLAND, ASSIGNOR TO WESTINGHOUSE ELECTRIC AND MANUFACTURING COMPANY, A COMPANY OF PENNSYLVANIA

ELECTRICAL TRANSFORMER

Application filed August 19, 1930, Serial No. 476,272, and in Great Britain August 20, 1929.

This invention relates to electrical transformers and has for its object to provide an improved arrangement for measuring a quantity such as the voltage thereof.

For measuring transformer voltages, especially in the case of high tension transformers, an additional winding is often inserted in the transformer structure which can be connected to a voltmeter which is calibrated so as to indicate the voltage of, for example, the high tension winding. For this purpose the additional winding is located in such a position as to intercept such a part of the magnetic flux which links the high tension winding, the voltage of which it is desired to measure, that proper allowance will be made automatically for leakage flux and other disturbing effects and the voltmeter will indicate at all loads the voltage of the transformer.

In practice it is sometimes difficult to determine precisely the proper location for a measuring winding of this description, or it may be found difficult to place the winding just at the desired position in the structure so that some degree of compensation will be required, which may be effected in various well-known ways.

According to the present invention, in order to avoid as far as possible the difficulties above indicated an auxiliary winding suitable for measurement purposes is provided in the transformer structure comprising a plurality of coils or convolutions located at different parts with respect to the transformer structure, and leads or tappings are brought out from this winding whereby the location of the different convolutions of the predetermined number of turns required for the measuring purposes may be subject to selection for connection to permanent terminals after the transformer has been completed in other respects. Various convolutions of the additional winding will have different relations with the main winding or windings that is, will intercept different amounts of the magnetic flux of the transformer, and by a process of trial and error using different tappings such a part of the additional winding can be selected for connection to the measuring instrument as will result in giving an indication nearest to the desired accuracy.

The invention will be more fully understood from the following description taken in connection with the accompanying drawing the single figure of which shows diagrammatically a section taken through an electrical transformer embodying the invention.

In the drawing a portion of the core of the transformer is designated at 1. The core is provided with a main low tension winding 2 and with a main high tension winding 3, it being understood that these windings are disposed around the core limb in customary manner. An auxiliary winding 4 having a number of concentric coils or convolutions is similarly disposed on the core adjacent one end of the core limb 1 and between the core 1 and the low tension winding 2 as shown. This auxiliary winding 4 is divided into a plurality of sections each with its terminal leads indicated at 5, and all the sections being provided with the same number of turns.

With the aforesaid arrangement of the auxiliary winding 4 it will be clear that, when the transformer is operating on load, the leakage flux between the main windings which is indicated in broken lines in the figure will be linked differently with each section of the auxiliary winding 4. Thus, the voltage across one of the sections of the auxiliary winding 4 will, by reason of the particular location of the convolutions with respect to the transformer structure, be more nearly proportional to the quantity to be measured, such as the voltage across one of the main windings, than will the voltage across any other section of the auxiliary winding 4 and therefore will be more suitable for connection to the measuring instrument which is intended to be employed.

In practice, the most suitable section or sections of the auxiliary winding, having the predetermined number of turns required for the measurement purposes, will be found by actual test. The selected tappings 5 found by trial and error, after the transformer has been completed in other respects, to give the most accurate measurement are brought out to suitable permanent terminals of the transformer (not shown) for connection to a measuring instrument.

As the number of turns for each section of the auxiliary winding 4 is the same, it will be appreciated that by connecting the measuring instrument to different tappings 5 of the auxiliary winding 4, the ratio of the connected turns of the auxiliary winding 4 and those of the main windings 2 and 3 will not be changed but only the position of the connected turns relative to the position of the main windings.

The auxiliary concentric winding 4 may be replaced by a concentric winding on the core of the transformer shown at 6 by a pancake form of winding shown at 7.

It will be readily appreciated that in addition to the auxiliary winding being utilized to give voltmeter indications, the invention is equally applicable for use where power measurement is desired either with or without indication of the voltage.

I claim:—

1. An electrical transformer comprising a core member, primary and secondary windings surrounding said core member, an auxiliary winding suitable for measurement purposes and comprising a plurality of winding sections located at different positions about the core member, leads connected to said sections whereby the location of a section required for measurement purposes may be subject to selection for connection to permanent terminals after completion of the transformer in other respects.

2. An electrical transformer according to claim 1 wherein the auxiliary winding is divided into a number of sections each with its terminal leads, each section being provided with the same number of turns.

3. An electrical apparatus comprising a core member, an exciting winding therefor, an auxiliary winding comprising a plurality of sections located about the core in fields of different magnetic intensities, said several sections being adapted to be selectively connected for measuring an electrical characteristic of said exciting winding.

4. An electrical apparatus comprising a core member, an exciting winding surrounding said core member, an auxiliary winding surrounding said core member and comprising a plurality of sections positioned along the axis of said core member in areas of different magnetic intensities.

5. An electrical apparatus comprising a core member, an exciting winding surrounding said core member, an auxiliary winding surrounding said core member and comprising a plurality of sections positioned radially from the axis of said core adjacent the end of said winding in areas of different magnetic intensities, and leads connected to said sections whereby a selected section may be employed for measuring an electrical characteristic of said exciting winding.

In testimony whereof I have hereunto subscribed my name this fifth day of August, 1930.

JOHN BENTLEY HANSELL.